United States Patent Office 3,394,297
Patented July 23, 1968

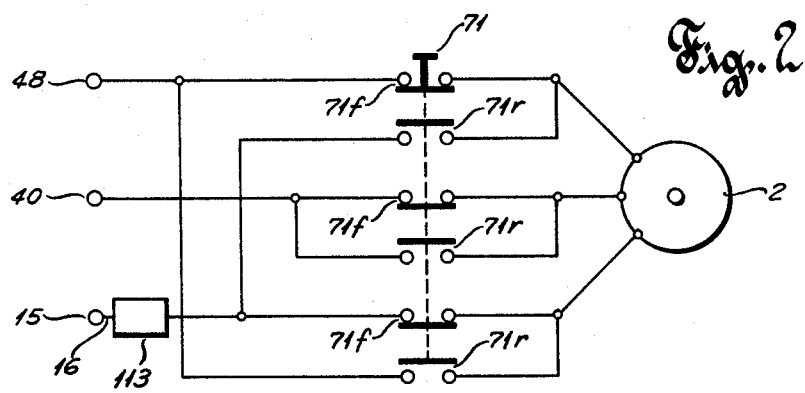
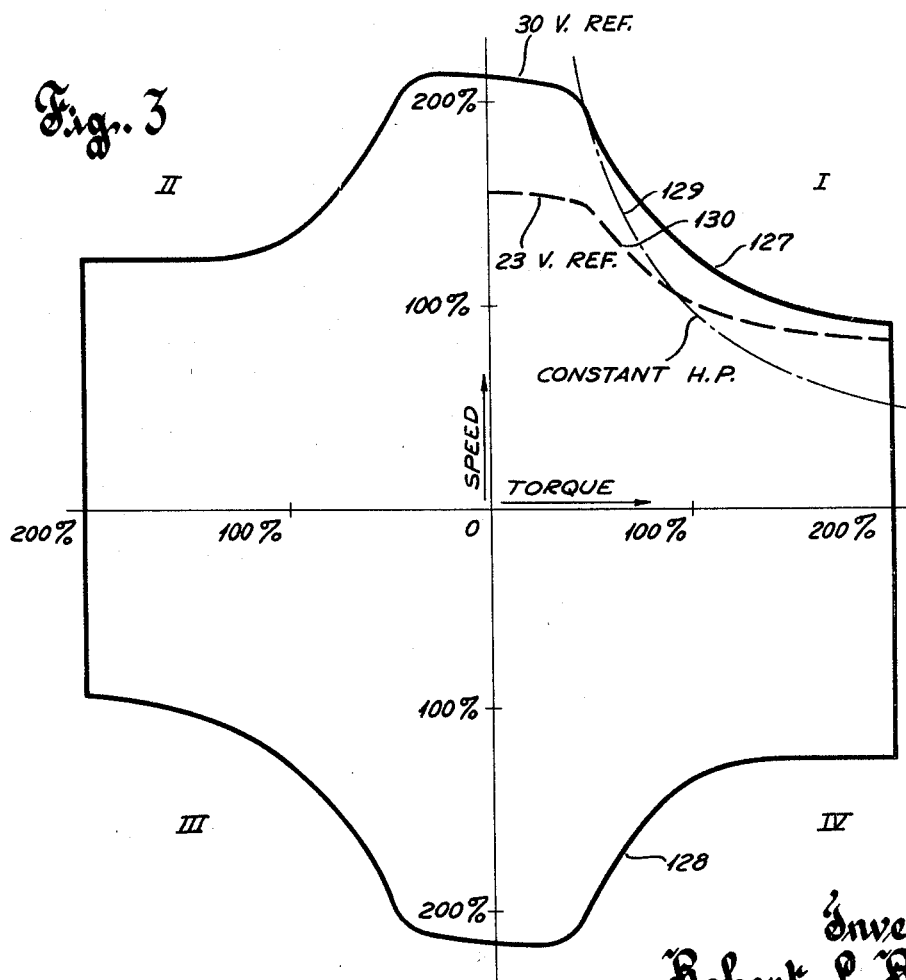

3,394,297
ADJUSTABLE FREQUENCY A.C. MOTOR CONTROL SYSTEM WITH FREQUENCY SPEED CONTROL ABOVE BASE SPEED
Robert L. Risberg, Milwaukee, Wis., assignor to Cutler-Hammer, Inc., Milwaukee, Wis., a corporation of Delaware
Filed Oct. 13, 1965, Ser. No. 495,549
8 Claims. (Cl. 318—227)

ABSTRACT OF THE DISCLOSURE

A three-phase induction motor control system including a controlled rectifier providing adjustable D.C. supply voltage to an inverter and adjustable control voltage to an oscillator which controls a firing circuit to control the inverter output frequency in proportion to the magnitude of the D.C. supply voltage whereby the inverter output voltage and frequency are proportionally controlled to full value to provide motor speed control to base speed. To control motor speed above base speed, another adjustable control voltage is applied to the oscillator whereby to increase the inverter output frequency alone above such base speed frequency while its magnitude remains constant. Current limit circuits prevent the motor from being loaded beyond its pull-out torque and time delay circuits limit frequency changes within mechanical time constant of the motor.

---

Figure 1A:
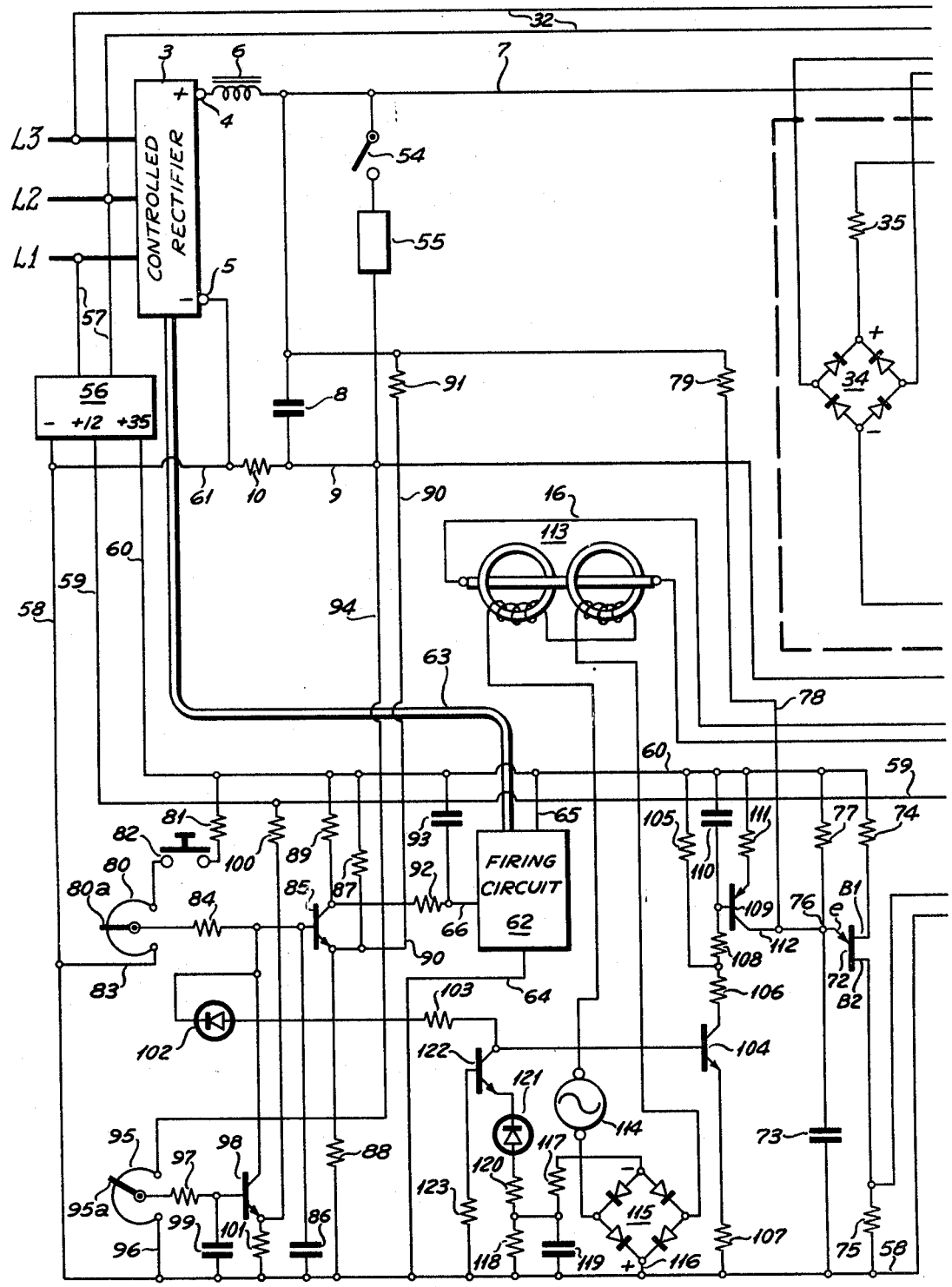

This invention relates to variable or adjustable, frequency A.C. motor controllers and more particularly to A.C. motor controllers employing variable frequency inverter means as a power source for the motor.

In certain applications it is frequently desirable to operate an electric motor at above 100% rated, or base, speed. This can be accomplished when the motor is operating at less than rated load, the lighter the load the greater the speed may be without exceeding safe power limitations. In D.C. motors this type of control may be accomplished by field weakening above base speed. In the variable speed control of A.C. motors such as squirrel cage induction motors the problem is more complex in that it is more difficult to control the strength and rotational speed of the field.

In an adjustable frequency A.C. motor control such as that disclosed in the copending Robert L. Risberg application Ser. No. 381,970, filed July 13, 1964, now patent No. 3,344,326, dated Sept. 26, 1967, and assigned to the present assignee, the frequency and magnitude of the voltage output of an inverter circuit are varied in proportion to the adjusted amplitude of the supply voltage. This results in constant volt seconds per half cycle in all phases of the motor and thereby assures a constant A.C. field strength in the motor. In many applications it would be desirable to increase the A.C. motor speed above base speed under lightly loaded conditions as long as the power limits of the motor are not exceeded. With such a control there would be available with an A.C. motor a range of control above base speed with certain desirable characteristics similar to the weakened field range in D.C. motors. The A.C. motor with its attendant advantages could thereby be used in a system with many of the desirable operating characteristics of a D.C. motor system.

It is therefore an object of this invention to provide in a variable frequency A.C. motor control, improved means for increasing the motor speed above base speed without increasing the amplitude of the motor voltage.

It is a further object of this invention to provide a control of the aforedescribed type with means sensitive to the motor load to limit the increase above base speed to values which will not cause the power capacity of the motor to be exceeded.

It is a more specific object of this invention to provide a control of the aforedescribed type which is stable in operation under overhauling conditions.

These objects are accomplished by providing an inverter type A.C. motor control, such as described in the aforementioned Risberg Patent No. 3,344,326, with means for increasing the motor supply frequency above that of base speed while the supply voltage amplitude remains constant. The system is further provided with motor load sensitive means effective to limit the aforementioned speed increasing means so as to not exceed the power limitations of the motor and, in effect, give the system a substantially constant horsepower operating characteristic above base speed. This load sensitive means is also effective to prevent the load from exceeding the motor pull-out torque. The effect of the speed increasing means is further limited by circuit means including a time delay circuit to limit changes of frequency in the field weakening range, that is, above base speed range, to values less than the rate of motor speed change as determined by the motor mechanical time constant to provide stability of operation under certain overhauling conditions, particularly in second and fourth quadrant operation.

A more complete understanding of the invention will be had and other objects will appear upon referring to the following description and claims.

While the motor control system hereinafter described is adapted to fulfill the objects stated, it is to be understood that it is not intended that the invention be confined to the particular preferred embodiment disclosed, since it is susceptible of various modifications without departing from the scope of the appended claims.

Figure 1B:
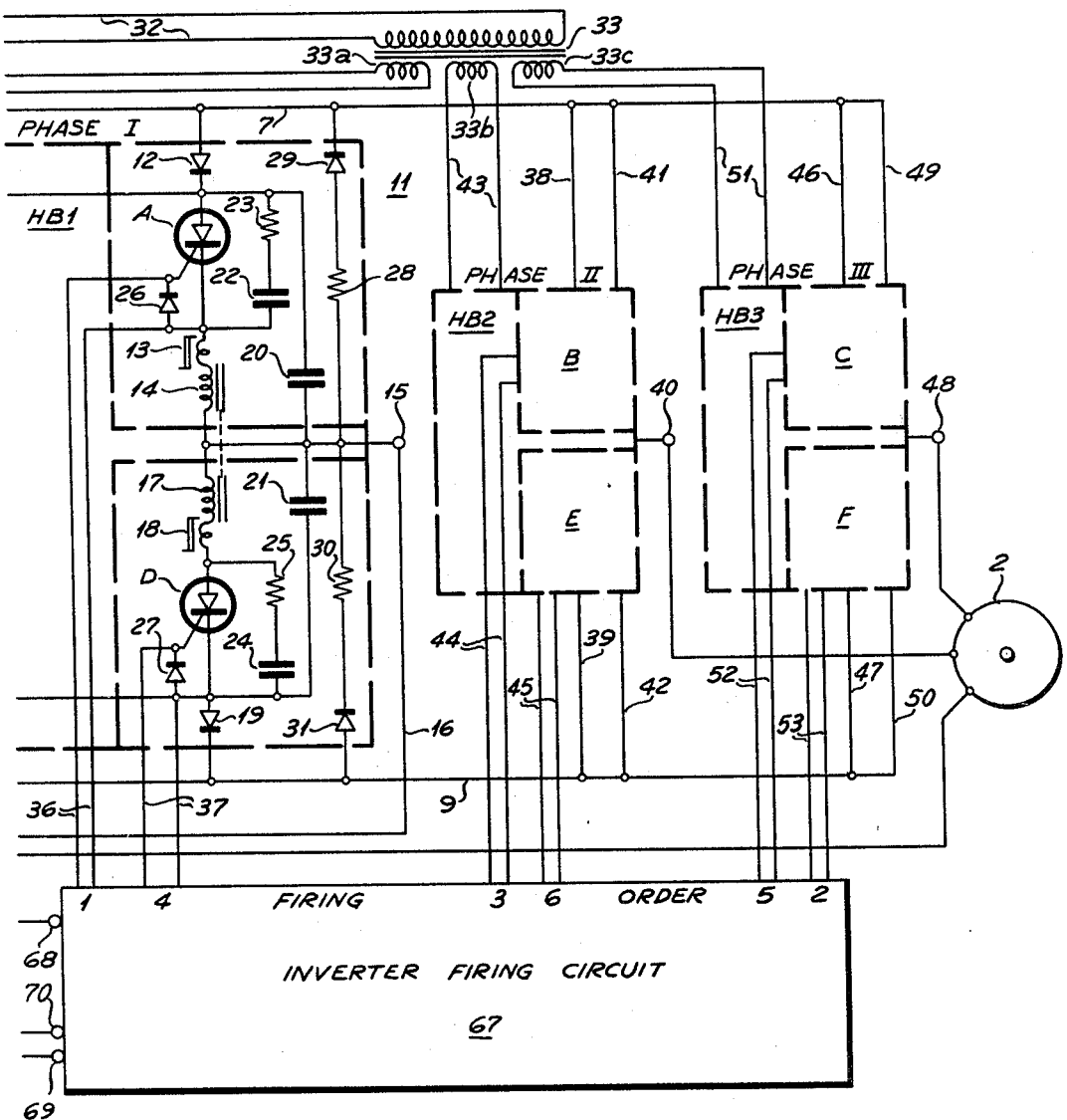

In the accompanying drawings:

FIGURES 1a and 1b constitute a circuit diagram of a motor control system embodying the claimed invention;

FIG. 2 is a circuit diagram showing a modification of the circuit of FIG. 1b; and FIG. 3 graphically depicts certain operating characteristics of the system of FIGS. 1a and 1b.

Referring to the drawings, there is shown a three-phase squirrel cage motor 2. Power circuitry for supplying motor 2 includes the input lines L1, L2 and L3 for supplying three-phase A.C. to a controlled rectifier 3, having a positive output terminal 4 and a negative output terminal 5. A smoothing inductance 6 is connected in series with a positive D.C. conductor 7. A filter capacitor 8 is connected between the positive conductor 7 and a negative conductor 9. An IR drop resistance 10 is included in the power loop in series with negative conductor 9.

Conductors 7 and 9 supply power to the input of a variable frequency A.C. inverter 11 of a type more completely described in the copending R. L. Risberg application Ser. No. 381,969, filed July 13, 1964, now Patent No. 3,355,654, dated Nov. 28, 1967, and assigned to the present assignee. The inverter 11 comprises three two-legged half-bridges HB1, HB2 and HB3 connected in parallel across supply conductors 7 and 9 to form a parallel inverter of the three-phase bridge type. The upper portions of half-bridges HB1–3 are provided with silicon controlled rectifiers A, B and C, respectively, and the lower portions thereof are provided with silicon controlled receifiers D, E and F, respectively. Since half-bridges HB2 and HB3 are similar to half-bridge HB1, only the latter will be described in detail, half-bridges HB2 and HB3 being shown schematically to avoid unnecessary duplication.

The power circuit in the upper leg of half-bridge HB1 extends from conductor 7 through unidirectional conducting diode 12, silicon controlled rectifier A, inductor 13 and commutating inductor winding 14 to inverter output terminal 15. A conductor 16 connects terminal 15 to the motor 2. In the lower leg of half-bridge HB1 a power circuit extends from terminal 15 through commutating inductor winding 17, inductor 18, silicon controlled rectifier D and a unidirectional conducting diode 19 to conductor 9. Inductors 13 and 18 are of the square hysteresis loop type and are connected in series with silicon controlled rectifiers A and D, respectively, for protecting the associated silicon controlled rectifiers from rapid changes in current. Inductor windings 14 and 17 are wound upon a common core as indicated by the dashed line and are poled so that a rapid increase in current through one leg of the half-bridge will induce in the inductor winding of the opposite leg a reverse voltage tending to turn off the silicon controlled rectifier of the opposite leg. A commutating capacitor 20 is connected between the anode of silicon controlled rectifier A and terminal 15. Similarly, a commutating capacitor 21 is connected between terminal 15 and the cathode of silicon controlled rectifier D.

A small capacitor 22 and a small resistor 23 are connected in series across silicon controlled rectifier A between the anode and cathode thereof. A similar capacitor 24 and resistor 25 are connected in series across silicon controlled rectifier D. These circuits function to slow down the rate of change of voltage across the silicon controlled rectifiers and to absorb recovery transients thereon.

Diodes 26 and 27 are placed between the cathodes and gates of the silicon controlled rectifiers A and D, respectively, to limit the magnitude of reverse bias voltage which may be applied to the gates thereof.

To provide a path of current flow due to the induced voltage of the inductors of each leg of the half-bridges and the induced voltage of the motor, each leg of each half-bridge is provided with a unidirectional voltage control or feedback circuit thereacross. For this purpose a resistor 28 and a diode 29 are connected in series from terminal 15 to conductor 7 to allow current flow in a reverse direction in shunt of inductor winding 14, inductor 13, silicon controlled rectifier A and diode 12. In a similar manner a resistor 30 and a diode 31 are connected in series from conductor 9 to terminal 15 in shunt of diode 19, silicon controlled rectifier D, inductor 18 and inductor winding 17.

Each half-bridge of inverter 11 is provided with a separate direct current source for precharging the commutating capacitors associated therewith. For this purpose a pair of conductors 32 connect A.C. power conductors L2 and L3 to the primary winding of a transformer 33. A secondary winding 33a supplies current to a rectifier bridge 34. The positive output of bridge 34 is connected through a resistor 35 to the junction between diode 12 and silicon controlled rectifier A. The negative output of bridge 34 is connected to the junction between silicon controlled rectifier D and diode 19. The output of bridge 34 is thereby connected across commutating capacitors 20 and 21 in series. A function of diodes 12 and 19 is to trap the charging voltage of capacitors 20 and 21 and to permit the charging thereof to a voltage higher than that appearing across D.C. conductors 7 and 9.

A pair of conductors 36 are connected to the cathode and gate of silicon controlled rectifier A for the purpose of supplying a firing current signal to the gate thereof. Similarly, a pair of conductors 37 are connected to the cathode and gate of silicon controlled rectifier D for supplying a firing current signal thereto.

Correspondingly, half-bridge HB2 has input conductors 38 and 39, and output terminal 40, feedback conductors 41 and 42, and precharging current conductors 43 leading from secondary winding 33b. Further, conductor pairs 44 and 45 supply firing current signals to silicon controlled rectifiers B and E, respectively. Similarly, half-bridge HB3 has input conductors 46 and 47, feedback conductors 49 and 50, an output terminal 48 and precharging current conductors 51 leading from secondary winding 33c. Conductor pairs 52 and 53 supply a firing current signal to silicon controlled rectifiers C and F, respectively.

Dynamic braking means are provided in FIG. 1a by a dynamic braking switch 54 and an electrical energy absorbing device 55. The latter may be a suitable resistance and may be stepped in relation to motor speed as is well known in the art. For a detailed description of a dynamic braking device particularly suited for this use, reference may be had to the copending R. L. Risberg application, Ser. No. 495,656, filed Oct. 13, 1965, and assigned to the present assignee. Switch 54 and device 55 are connected across D.C. power conductors 7 and 9 to absorb current which is regenerated through the feedback paths consisting of diodes 29 and 31 and resistors 28 and 30, in half bridge HB1 and like elements and conductors 41, 42, 49 and 50 in half-bridges HB2 and HB3.

The control circuits for the inverter system are supplied with operating voltages from a direct current source 56 which in turn is supplied through a pair of conductors 57 from A.C. lines L1 and L2. Voltage source 56 supplies a negative or ground conductor 58, a positive 12-volt conductor 59 and a positive 35-volt conductor 60. A conductor 61 connects negative or ground conductor 58 to the negative terminal 5 of the controlled rectifier 3 to provide a common ground connection.

A three-phase firing circuit 62 is provided with means for supplying adjustable phase angle firing current pulses to controlled rectifier 3 which may preferably be of the silicon controlled rectifier type. These firing pulses are carried from firing circuit 62 to controlled rectifier 3 via suitable conductors within conduit 63. The 35-volt power supply of conductors 58 and 60 is connected to firing circuit 62 by conductors 64 and 65. The phase angle of firing pulses of firing circuit 62 and consequently the magnitude of voltage output from controlled rectifier 3 are varied in accordance with the magnitude of the signal voltage impressed on an input signal conductor 66. Firing circuit 62 is shown as a rectangle for the sake of simplicity and reference may be had to R. W. Spink copending application Ser. No. 248,314, filed Dec. 31, 1962, now Patent No. 3,281,645, dated Oct. 25, 1966, for a detailed illustration and description of a circuit suitable for this purpose, this copending application being assigned to the assignee of this invention.

As shown schematically in FIG. 1b, the inverter system is provided with a firing control circuit 67 of the ring shift register type for rendering silicon controlled rectifiers A–F conducting in a predetermined order. The firing control circuit 67 is energized through terminals 68 and 69 from the 12-volt D.C. conductors 59 and 58, respectively. The firing control circuit 67 is further provided with six outputs connected through pairs of conductors 36, 44, 52, 37, 45 and 53 across the gates and cathodes of silicon controlled rectifiers A–F, respectively. The firing control circuit 67 applies firing currents through these pairs of output conductors to render the silicon controlled rectifiers conducting in a predetermined repetitively sequential order. The numerals along the upper portion of firing control circuit 67 indicate the order in which the firing pulses are applied to the inverter circuit 11. Consequently, with reference to the silicon controlled rectifiers, the firing order is A, F, B, D, C and E. The firing control circuit 67 provides three outputs at all times which maintain three silicon controlled rectifiers conducting at all times and this conduction of three is shifted or advanced among the six. When a fourth silicon controlled rectifier is fired, the first output pulse is terminated and the first silicon controlled rectifier is reversed biased by its commutating inductor and rendered non-conducting. In addition, the gate-cathode circuit of the silicon controlled rectifier to be turned off is reversed biased by a reverse voltage applied through the associated output of firing circuit 67. As each silicon controlled rectifier is fired in order, the silicon controlled rectifier in the opposite leg of the same half-bridge is turned off in a similar manner. This firing sequence is arranged to produce a three-phase output voltage from inverter 11. Each phase of this output voltage consists of a square wave having a 60° dwell on either side of the 120° pulse. Further, the three phases are displaced 120° apart. The operation of firing circuit 67 is controlled by a train of pulses applied to a terminal 70, each pulse of the train causing a one-step advance in the sequential firing of the silicon controlled rectifiers of inverter 11. Consequently, the frequency of the output of inverter 11 is proportional to the frequency of pulses applied to terminal 70. For a detailed illustration and description of a firing control circuit usable for this inverter system, reference may be had to the aforementioned Risberg Patent No. 3,344,326.

Motor 2 may be reversed by means incorporated in firing circuit 67 to reverse the firing order of two of the three phases of current supplied to motor 2. For a detailed description of a firing control circuit having such means and suitable for use in this system, reference may be had to R. L. Risberg copending application Ser. No. 495,595, filed Oct. 13, 1965, and assigned to the assignee of this invention. Ultimately, switching means may be provided in the output conductors of firing circuit 67 to similarly reverse the firing order of two of three phases. FIG. 2 illustrates a third means of accomplishing reversal of motor 2. Reversing switch 71 is furnished with three forward contacts 71f and three reverse contacts 71r. It can be seen that operation of switch 71 will reverse the connections of phase one and phase three to reverse two of the three phases of power current to motor 2 and there accomplish reversal of motor 2.

The frequency control pulses applied to terminal 70 of firing circuit 67 are the output of a relaxation oscillator of a unijunction transistor type including a unijunction transistor 72 having a first base B1, a second base B2 and an emitter e. The oscillator further comprises a capacitor 73, a temperature compensating resistor 74 and a load resistor 75. It is the function of this relaxation oscillator to provide a train of pulses to terminal 70, the frequency of these pulses being proportional to the magnitude of signal current flowing to point 76 at the junction of emitter e and capacitor 73. Interbase voltage is supplied to unijunction transistor 72 from conductor 60 through resistor 74 and through resistor 75 to conductor 58. The capacitor 73 of the relaxation oscillator integrates the current input signal until the unijunction transistor 72 breaks down and again integrates until unijunction transistor 72 again breaks down, etc. Resistor 77 connected between conductor 60 and point 76 provides a minimum signal affording a minimum frequency below which the relaxation oscillator will not operate. A conductor 78 is connected through a resistance 79 to the positive side of filter capacitor 8 to provide a signal to point 76 proportional to the D.C. output voltage of controlled rectifier 3. This latter signal, when controlling, will cause the frequency of the output of inverter 11 to vary, above such minimum values, in proportion to the voltage magnitude of the output of controlled rectifier 3. This insures constant volt seconds per half cycle in all phases of the motor 2. Thus, while the signal through conductor 78 is controlling, there is a constant A.C. field strength in motor 2, and motor 2 operates in a constant torque range below its base speed.

The motor speed reference signal for the system is obtained from a speed setter potentiometer 80 through its slider 80a. The voltage supply is obtained from conductor 60 through a voltage dropping resistor 81 and a manually closeable start switch 82 to one side of potentiometer 80. The opposite terminal of potentiometer 80 is connected through a conductor 83 to the negative or ground conductor 58. The voltage appearing across conductors 60 and 58 is 35 volts. The resistance of resistor 81 in series with potentiometer 80 is chosen to provide a 5-volt drop. The voltage appearing across potentiometer 80 is therefore 30 volts and the reference voltage on slider 80a may therefore be varied from 0 to 30 volts. The control circuits are arranged, as will be hereinafter explained, so that the reference voltage from 0 to 15 volts will control motor 2 in its constant torque range below base speed, and the reference voltage range from 15 volts to 30 volts will provide speed control in the constant horsepower range above base speed.

During constant torque operations below base speed, the effective speed reference signal is transmitted from slider 80a through a resistor 84 to the base of a comparable amplifier transistor 85. A capacitor 86 is connected between the base of transistor 85 and ground, and capacitor 86 together with resistor 84 form an RC time delay circuit for limiting the change of the speed reference signal to desirable values. Transistor 85 is operated in the amplifying mode with resistor 87 connected between conductor 60 and the emitter of transistor 85 to provide an "off" bias. A feedback resistor 88 is connected between the emitter of transistor 85 and the ground conductor 58. A load resistor 89 is connected between conductor 60 and the collector of transistor 85, and the output voltage of this amplifier stage appears thereacross. A conductor 90 is connected to the positive output of controlled rectifier 3 through a resistor 91 and is connected to the emitter of transistor 85 to provide a voltage feedback signal. Transistor 85 therefore functions to compare the speed reference signal on its base with the voltage feedback signal at its emitter, with the output voltage appearing at its collector. This output signal voltage is connected through a resistor 92 to the input signal conductor 66 of firing circuit 62. A capacitor 93 is connected between conductor 60 and input conductor 66, and capacitor 93 together with resistor 92 comprises an RC circuit for smoothing the voltage signal. The voltage signal appearing at conductor 66 functions as herebefore described to control the magnitude of the output of controlled rectifier 3. The control circuitry just described is arranged so that when the speed reference signal appearing at slider 80a reaches 15 volts, the output of controlled rectifier 3 reaches its maximum voltage and a further increase in the reference signal appearing at 80a above 15 volts will not further increase the magnitude of the voltage output of controlled rectifier 3. Therefore as the speed setting rheostat 80 is moved through the range of 0 to 15 volts the output of controlled rectifier 3 increases correspondingly, and the frequency control signal transmitted through conductor 78 to unijunction transistor 72 causes the motor speed to also increase proportionately. When the reference signal on slider 80a reaches 15 volts, and assuming the absence of a current limit signal as later described, the amplitude of the output of inverter 11 reaches its maximum and the frequency of the output of inverter 11 is such that motor 2 will run at its base speed.

Current limiting control means are also provided. A conductor 94 connects one side of IR dropping resistor 10 at the negative power conductor 9 to one side of a current limit potentiometer 95, the other side being connected to conductor 96, through ground conductor 58 and through conductor 61 to the opposite side of the IR dropping resistor 10. A slider 95a on potentiometer 95 may be adjusted to provide the desired degree of current limit control. The motor might typically be limited to 150% rated current and therefore limited to about 150% rated torque in the constant torque range. As can be seen, the voltage on slider 95a will vary in proportion to the magnitude of the load current passing through resistor 10. Slider 95a is connected through a resistor 97 to the base of a transistor 98 which is operated in the amplifying mode. A capacitor 99 is connected between the base of transistor 98 and ground conductor 58 and together with resistor 97 forms an RC filter. A resistor 100 and a resistor 101 are connected in series between conductor 59 and ground conductor 58 and at their juncture are connected to the emitter of transistor 98 to provide an "off" bias. The collector of transistor 98 is connected to the base of comparator amplifier transistor 85.

As the current limit signal on slider 95a increases and becomes sufficiently high, transistor 98 becomes conductive to form a variable shunt between the base of transistor 85 and ground. As the current limit signal becomes sufficiently high, the signal appearing at the base of transistor 85 is limited and consequently the motor speed signal at conductor 66 is reduced to limit the speed of motor 2 in its constant torque range.

*Above base speed operation*

As the slider 80a is moved so that the speed signal appearing thereon increases above 15 volts, a Zener diode 102 spills over to transmit through a resistor 103 a voltage signal to the base of an amplifying transistor 104. Assuming the absence of a current regulating signal as hereinafter described, this signal to the base of transistor 104 is proportional to the magnitude of the signal on slider 80a when it exceeds 15 volts. A pair of resistors 105 and 106 connect the collected of transistor 104 to conductor 60, and the output signal of this amplifier stage appears at their junction. A local feedback resistor 107 connects the emitter of transistor 104 to the ground conductor 58.

The signal appearing at the juncture of resistors 105 and 106 is transmitted through a resistor 108 to the base of transistor 109. A capacitor 110 is connected between the base of transistor 109 and conductor 60. Capacitor 110 and resistor 108 together form an RC time delay circuit for slowing down the rate of change of the signal appearing at the base of transistor 109. For certain types of motor operation this time delay circuit may be omitted and the juncture of resistors 105 and 106 may be connected directly to the base of transistor 109. However, the inclusion of resistor 108 and capacitor 110 provides important advantages under certain conditions of motor operation. The values of resistance and capacitance may, for instance, be chosen to provide a time delay in the change of speed signal which is greater than the time delay in the change of motor speed provided by the mechanical time constant of the motor. The importance of this feature will hereinafter be more fully described. The emitter of transistor 109 is connected to conductor 60 through an emitter resistor 111. The output of this stage appears in a conductor 112 connected to the collector of transistor 109. The current transmitted therethrough is proportional to the voltage signal appearing between the base of transistor 109 and conductor 60 and furnishes a current signal to point 76 to increase the speed of motor 2 above its base speed. In this speed range above the base speed, the voltage amplitude of the power supplied to motor 2 remains constant and the motor must therefore be limited to a substantially constant horsepower mode of operation.

In the speed range above base speed, the frequency of the A.C. power supplied to motor 2 increases while the amplitude of the voltage remains constant. This results in a weakening of the A.C. field strength as the speed increases and a consequent lowering of the pull-out torque. For the purpose of preventing the motor from exceeding pull-out torque in the range above base speed and for the purpose of limiting the current drawn by the motor in this range, current limiting means are provided to be effective in the field weakining range above base speed. A transductor 113 is introduced to sense the magnitude of phase I current flowing through inverter output terminal 15. An A.C. power source 114 is connected in series with transductor 113 and the A.C. output of transductor 113, which increases as a function of the motor current, is connected to the input terminals of a rectifier bridge 115. The positive output terminal of rectifier bridge 115 is connected to the ground conductor 58 through a conductor 116. The negative terminal of rectifier bridge 115 is connected to ground conductor 58 through a voltage divider consisting of a resistor 117 and a resistor 118 in series. A filter capacitor 119 is connected between ground conductor 58 and the junction of resistors 117 and 118 for the purpose of smoothing the D.C. output signal which appears at the junction of resistors 117 and 118. The junction of resistors 117 and 118 is connected through a resistor 120 to a Zener diode 121 and thence to the emitter of a transistor 122. A taper resistor 123 connects the base of transistor 122 to the ground conductor 58 to operate transistor 122 in an amplifying mode. The collector of transistor 122 is connected to the base of amplifying transistor 104.

In the event the motor current exceeds a proper value the Zener diode 121 spills over. Zener diode 121 and other components of the associated current limiting circuit are chosen so that Zener diode 121 spills over if the motor current exceeds about 100%. As current flows through Zener diode 121 transistor 122 becomes conductive to lower the potential of the speed signal appearing at the base of transistor 104, and the greater the motor current becomes, the greater becomes the lowering effect. Thus the current limiting circuit just described is effective to limit the speed of the motor in the weakened field range and thus prevent motor 2 from exceeding its current and torque limitations.

FIG. 3 illustrates the speed-torque characteristics of an exemplary motor control system incorporating the invention. These curves would be typical of a motor control system using reversing and dynamic braking and therefore providing four quadrant control. The upper and lower curves 127 and 128 show the steady state speed torque relations for a reference speed signal on potentiometer 80 of the maximum of 30 volts. As can be seen, the no-load speed is extended to beyond 200% of rated speed by means of frequency field control and the characteristic droops along a substantially constant horsepower curve as torque is increased. Curve 129 is drawn in quadrant I to illustrate a constant horsepower curve. At 200 percent torque, for example, depending on where the current limit slider 95a is set, the torque remains constant and the speed decreases if the load is increased.

The dashed line 130 is drawn in quadrant I to show the speed-torque curve for a reduced reference speed signal of 23 volts on potentiometer 80.

As is well known in the art, a D.C. motor system in a usage such as a hoist may become unstable under overhauling load conditions unless the mechanical time constant of the winch motor and load reflected to the motor shaft is much shorter than the effective motor field time constant. This means that the motor speed must change more rapidly than the motor flux can change. Similarly, in A.C. motor control the mechanical time constant must be shorter than the effective time constant of the A.C. motor field. As previously mentioned, resistor 108 and capacitor 110 are inserted to delay the rate of change of the speed and frequency signal. Since in an A.C. induction motor the field strength weakens as the frequency increases if the voltage remains constant, resistor 108 and capacitor 110 are effective to slow up the rate of change of the motor field strength and overcome the difficulty of instability under overhauling conditions.

I claim:

1. A system for supplying an alternating current output of adjustable frequency and magnitude comprising:
   means providing a source of D.C. voltage which is selectively adjustable to full value;
   inverter means supplied with a direct current input of adjustable voltage magnitude from said source and being controllable to provide an alternating current output having a voltage magnitude proportional to the voltage magnitude of said input;
   means for controlling said inverter means to control the frequency of said alternating current output in proportion to the voltage magnitude of said input up to a base point frequency corresponding to said full value of said source voltage at which the voltage magnitude of said output reaches maximum;
   and means for increasing the frequency of said output above that frequency produced at said base point while said controlling means maintains the voltage magnitude of said output substantially constant at that magnitude produced at said base point.

2. A control system for an alternating current motor comprising:
   means for providing a speed control signal representative of the desired motor operating speed including means for varying the value of said signal above and below a predetermined signal level representative of the motor base speed;
   controllable rectifier means supplied from a source of alternating current and means responsive to said speed control signal as it is varied below said predetermined level for operating said controllable rectifier means to provide a direct current output of a voltage magnitude variable substantially in proportion thereto a full value representative of the motor base speed at said predetermined level of speed control signal;
   inverter means supplied with said direct current output of said controllable rectifier means for, in turn, supplying A.C. power to the motor, the frequency of the output of said inverter means being substantially determinative of the motor speed;
   control circuit means for controlling said inverter means with respect to the frequency of the output of said inverter means in proportion to said speed control signal as it is varied in the range below and up to said predetermined level at which said frequency reaches a value representative of motor base speed;
   and means for controlling said inverter means with respect to the frequency of the output of said inverter means in proportion to said speed control signal as it is varied above said predetermined level to provide a higher frequency causing the motor to run above said base speed and as the voltage magnitude of the output of said inverter means remains substantially constant.

3. The invention as defined in claim 2 together with load limiting means effective in the range above motor base speed comprising means responsive to motor load for limiting the frequency of the output of said inverter means in the frequency range above that frequency corresponding to motor base speed in response to increased motor loads to thereby impose a limit on the speed of the motor above base speed as a function of motor load.

4. The invention as defined in claim 3, together with time delay means to limit the rate of change of frequency in the range above base speed frequency to values less than that which corresponds to the rate of change of motor speed as determined by the mechanical time constant of said motor to provide stability of operation under overhauling conditions.

5. A motor control system for supplying multiphase alternating current electrical power of adjustable frequency and voltage to an alternating current motor of the induction type and for controlling the motor speed in a substantially constant torque range below its base speed and in a weakened field range above its base speed comprising:
   reference voltage means for providing an adjustable speed reference voltage representative of the desired operating speed of the motor and including means for varying said reference voltage above and below a predetermined level representative of the motor base speed;
   controllable rectifier means supplied from a source of alternating current and means responsive to said speed reference voltage as it is varied below said predetermined level for operating said controllable rectifier means to provide a direct current output of a voltage magnitude variable substantially in proportion thereto to a full value representative of the motor base speed at said predetermined level of speed reference voltage;
   inverter means supplied with said direct current output of said controllable rectifier means for, in turn, supplying multiphase power to the motor, the frequency of the output of said inverter means being substantially determinative of the motor speed;
   first control circuit means responsive to the voltage magnitude of said direct current output of said controllable rectifier means for controlling said inverter means with respect to the frequency of the output of said inverter means substantially in proportion to the voltage magnitude of said direct current output as said reference voltage is varied in the range below and up to said predetermined level at which said frequency reaches a value representative of motor base speed;
   and second control circuit means responsive to said reference voltage as said reference voltage is varied in the range above said predetermined level for controlling said inverter means with respect to the frequency of the output of said inverter means substantially in proportion to said reference voltage to provide a higher frequency causing the motor to run above said base speed.

6. The invention as defined in claim 5 together with current limit means effective in the range above motor base speed comprising means for limiting the frequency of the output of said inverter means in the frequency range above that frequency corresponding to motor base speed in response to increased motor current to thereby impose a limit on the speed of the motor above base speed as a function of motor current.

7. The invention as defined in claim 6 together with time delay means to limit the rate of change of frequency in the range above base speed frequency to values less than that which corresponds to the rate of change of motor speed as determined by the mechanical time constant of the motor to provide stability of operation under overhauling conditions.

8. The invention as defined in claim 6, in which said inverter is bilateral in that current regenerated by the motor is returned to the input supply as direct current, together with energy absorbing means connectable to said direct current input to absorb regenerated current and thereby furnish dynamic braking of said motor.

References Cited
UNITED STATES PATENTS

| 2,784,365 | 3/1957 | Fenemore et al. | 318—231 XR |
| 3,105,180 | 9/1963 | Burnett | 318—231 XR |

ORIS L. RADER, *Primary Examiner.*

G. RUBINSON, *Assistant Examiner.*